United States Patent [19]

Hall et al.

[11] Patent Number: 4,604,007

[45] Date of Patent: Aug. 5, 1986

[54] CUTTING TOOL

[75] Inventors: Luke Hall, Missouri City; Jerry M. Multop, Stafford, both of Tex.

[73] Assignee: Progressive Technology, Inc., Stafford, Tex.

[21] Appl. No.: 697,205

[22] Filed: Feb. 1, 1985

[51] Int. Cl.⁴ .............................................. B23C 1/16
[52] U.S. Cl. .................................... 409/89; 33/23.11; 409/92; 409/109
[58] Field of Search ................... 409/107, 109, 92, 89, 409/86, 93, 103; 33/23 K, 25 R

[56] References Cited

U.S. PATENT DOCUMENTS

| | | | |
|---|---|---|---|
| 655,750 | 8/1900 | Barr | 409/92 |
| 1,389,462 | 8/1921 | Spreadbury | 409/109 |
| 1,985,715 | 12/1934 | Bucky | 33/23 K |
| 2,311,943 | 2/1943 | Holcomb | 409/109 |
| 2,689,505 | 9/1954 | Ossenbach | 409/89 |
| 2,713,289 | 7/1955 | Zwick | 409/89 |
| 2,742,823 | 4/1956 | Compton | 33/25 R |
| 2,793,569 | 5/1957 | Tanner et al. | 409/89 |
| 3,777,616 | 12/1973 | Mueller | 409/109 |
| 4,095,633 | 6/1978 | Kimball et al. | 409/109 X |
| 4,300,863 | 11/1981 | Partain | 409/109 |

FOREIGN PATENT DOCUMENTS 823896 1/1938 France .......................... 33/25 R Primary Examiner—William R. Briggs
Attorney, Agent, or Firm—Edmund F. Bard

[57] ABSTRACT

Apparatus is provided for guiding a powered cutting tool as a function of a traced preselected pattern. The apparatus preferably includes a table member for supporting both of work piece and a paper or the like, exhibiting the pattern of interest. A first pair of rail members are fixedly mounted to or adjacent opposite sides of the table member, in parallel with each other, and on opposite sides of both the work piece and the paper exhibiting the pattern. In addition, a carriage assembly is slidably positioned on the first pair of rails, for movably supporting a stylus above the paper exhibiting the pattern, and for movably supporting the cutting tool and its driving mechanism adjacent the work piece.

20 Claims, 12 Drawing Figures

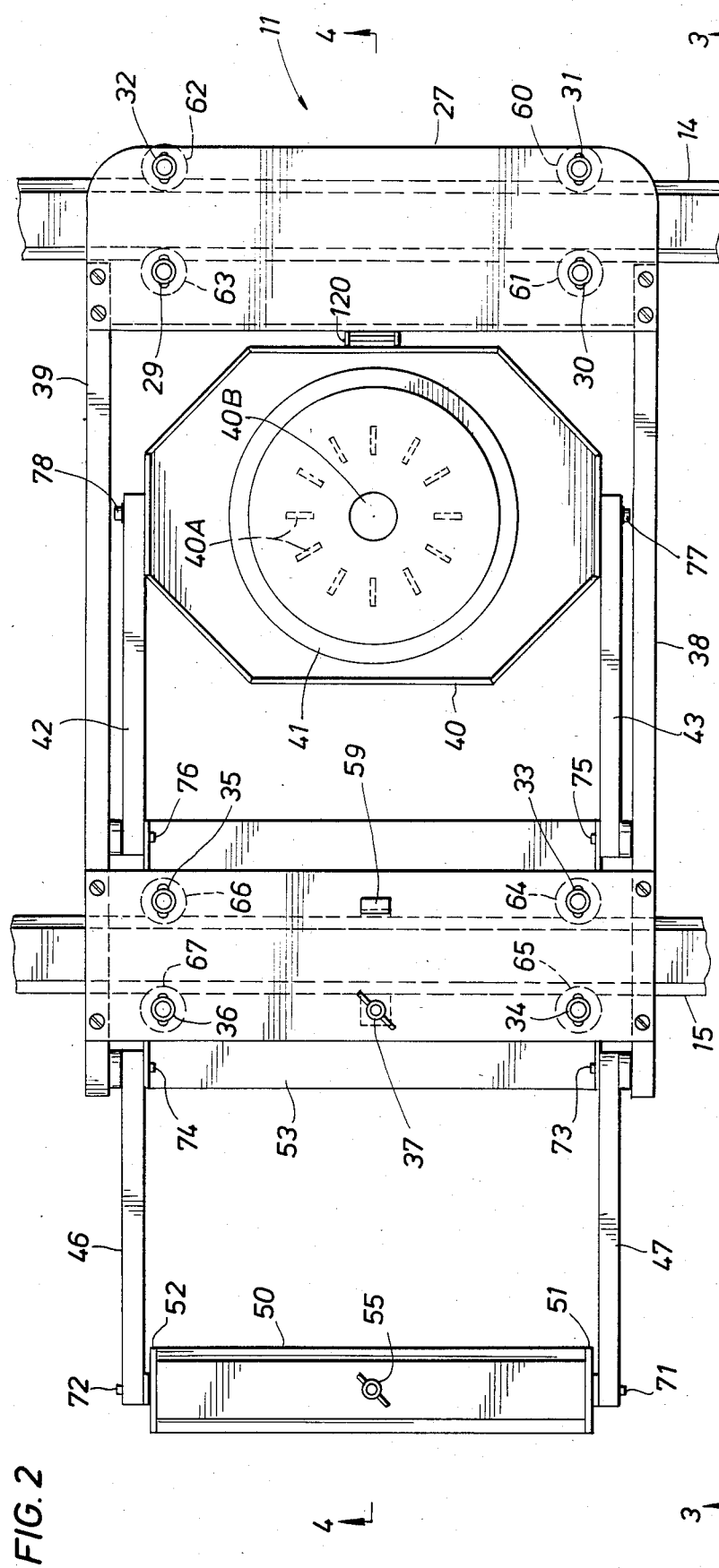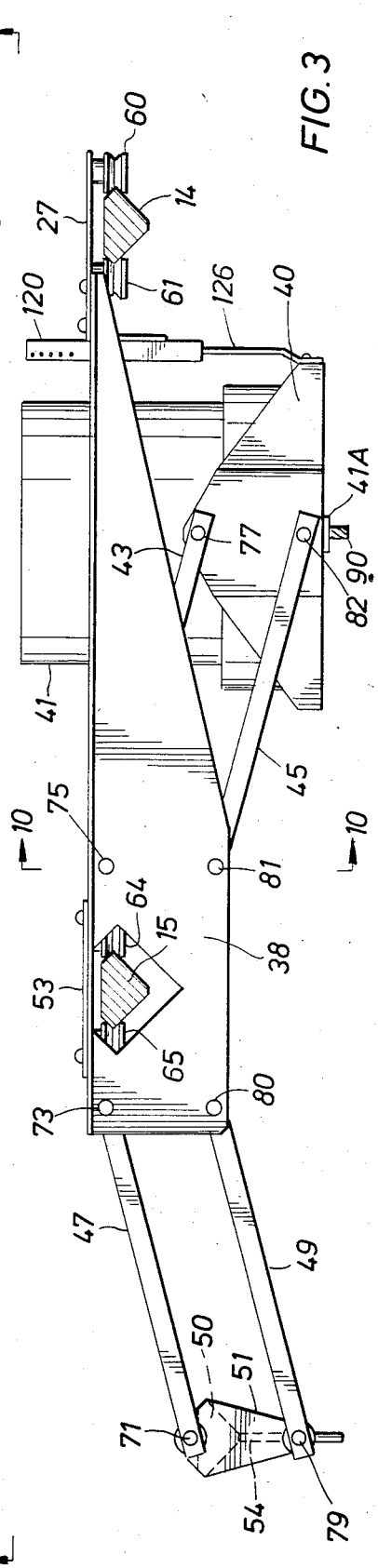

CUTTING TOOL

BACKGROUND

This invention relates to methods and apparatus for directing a movable cutting tool, and more particularly relates to an assembly for manipulating a powered router bit according to a preselected design.

It is conventional to employ a jig and the like to direct the movement of a powered cutting tool, and it is further conventional to employ a powered router bit to cut a design into the surface of a work piece according to a preselected design such as a template or pattern. More particularly, it is within the scope of the prior art to manipulate the router bit by guiding the tip of a stylus according to a design or pattern within a plane associated with the work piece.

In operating this type of equipment, the stylus and cutting bit are linked together so that when the stylus is moved either laterally or vertically, according to the pattern sought to be followed, the cutting bit will move against the work piece in precise conformity with the action of the stylus. However, this requires that the cutting bit not only move axially the same as the stylus, it further requires that the bit is continually positioned exactly as the stylus with respect to all three axes of both the pattern and the work piece. In particular, the bit must not only move the same as the stylus according to the X and Y axes of the pattern and work piece, the bit must also be maintained in alignment with the Z-axis the same as the stylus.

Those having experience with equipment of this type will readily appreciate that there is an ever present problem in maintaining the relationship of the bit to the stylus, while the router bit is engaging the work piece. This is because the router bit is arranged to rotate about the Z-axis, while the design sought to be followed requires the bit to move according to the X and Y axes of the pattern. It is apparent that merely driving the bit against the work piece will, by itself, tend to tilt the bit. However, rotation of the router bit alone imparts heavy torque to the bit, and when the rotating bit moves against the work piece according to X and Y axes, this torque also tends to tilt or otherwise further misalign the bit with respect to the Z-axis of the pattern which is sought to be followed. This is especially the case whenever the bit is moved along the Z-axis as well as in conjunction with being moved with respect to the X and Y axes of the work piece.

The problem is especially troublesome whenever time is significant factor in producing a finished item, since the extent of such misalignment is a function of both the force with which the router bit is driven against the work piece, and the hardness or toughness of the material being cut by the router bit. Thus, the extent of such misalignment depends on a combination of these factors, and when such factors increase to a sufficient extent, it has been found that the assembly holding the bit and directing its movement tends to warp or deform relative to the plane of the material sought to be cut, whereby the finished product does not conform to the pattern.

There are, of course, routers which will produce precision shaped products on a mass production basis, notwithstanding the problems hereinbefore described. In these devices, however, misalignment of the bit has been prevented simply by mounting it in a massive, and therefore expensive chassis which, in turn, often requires powered apparatus to operate. In addition, many routers in the prior art are also unsuitable from a safety standpoint, for the reason that the hands of the operator are not sufficiently shielded from the bit action, and hence these routers constitute a potential hazard to the operator and anyone close to the device.

Devices of this types are, of course, inherently not suitable or within the capability of many potential operators having a need for equipment which is not only cheaper but easier to use. Until now, however, no such device has been available notwithstanding this continued need.

These disadvantages of the prior art are overcome with the present invention, and commercially acceptable embodiments of a machine with a revolving vertical spindle and cutter for milling out the surface of wood, metal, and the like are herein provided which are not only fully capable of milling out the surfaces of work pieces under most operating conditions, but which are also capable of other tasks completely beyond the capabilities of the machines of the prior art. More particularly, however, the embodiments of the present invention are capable of operation with a much higher efficiency and at a substantially reduced cost of construction and operation.

SUMMARY OF THE INVENTION

In a preferred embodiment of the present invention, a router assembly is provided having a first carriage glidably supported on a first pair of spaced-apart rails, and a second carriage glidably supported on a second pair of rails. More particularly, the router bit and motor is vertically mounted on the second carriage, and the second rails are mounted on the first carriage perpendicularly of the first rails, whereby the router bit may be shifted along both the X and Y axes of the work piece sought to be cut.

The second carriage is also preferably provided with a handle for shifting the router bit, and a yieldable stylus interconnected with the handle for tracing a pattern on a sheet of paper located adjacent the work piece. More particularly, the operator of this device will cause the router bit to cut the surface of the work piece in functional relationship to the movement of the stylus along the pattern.

The second carriage, which supports the motor and router bit, is also adapted to be yieldably arranged above the work piece whereby downward pressure on the handle will correspondingly drive the second carriage downwardly towards the work piece. Thus the cutting bit will only engage the work piece when the operator urges the handle downwardly to press the tip of the stylus against the surface of the paper exhibiting the pattern of interest.

An important requirement of this type of device is the ability to faithfully follow the pattern exhibited on the paper, notwithstanding the tendency for the cutting bit to be driven out of alignment by the torque generated by the motor. In the preferred embodiment of the present invention, stiffness is achieved through the use of sheet metal parts formed to oppose such deformation, rather than the use of massive and more expensive structural components. This, in turn, contributes to the ease whereby the assembly may be operated to cut the work piece according to the pattern sought to be followed.

Another particular advantage of this embodiment is that this device may be used to shape almost any size of work piece. If the work piece cannot be conveniently fitted between the first pair of rails, the rails may be transferred to the work piece itself whereby the work piece performs the function of the table.

It should further be noted that the device hereinafter described in detail may conveniently be employed in conjunction with a conventional bench-type lathe. In particular the device is preferably arranged above or adjacent the work piece engaged in the lathe, and as the work piece is revolved in the lathe the device may be manipulated according to either a pattern on a sheet of paper, or the device may be manipulated by causing the stylus to engage and follow a template or the like.

Accordingly, it is a feature of the present invention to provide improved means for manipulating a movable cutting bit engaging a work piece.

It is also a feature of the present invention to provide an improved router assembly and the like.

It is further a feature of the present invention to provide an improved router assembly which is capable of more faithfully registering a cutting bit with the details of a pattern sought to be followed.

It is also a feature of the present invention to provide a router assembly capable of accommodating to substantially any size or shape of a work piece.

It is further a feature of the present invention to provide a router assembly capable of operating in conjunction with a lathe and the like.

It is a particular feature of the present invention to provide shaping means for shaping a work piece, comprising cutting means for rotatably cutting said work piece, stylus means for engaging and tracing a pattern exhibited on a paper and the like, and support means for maneuvering said cutting means in alignment with said stylus means, including first shorter and longer strut members each pivotally connected adjacent at one end with said stylus means, second shorter and longer strut members each pivotally conected adjacent at one end with said cutting means and linking means pivotally interconnected with the other ends of said first and second shorter strut members and at points between the ends of said first and second longer strut members, said first and second longer strut members further being pivotally and slidably interconnected adjacent the other ends therof.

These and other features and advantages of the present invention will become apparent from the following detailed description, wherein reference is made to the figures in the accompanying drawings.

IN THE DRAWINGS

FIG. 2 is an overhead pictorial representation of a portion of the apparatus depicted generally in FIG. 1.

FIG. 3 is a side-view pictorial representation of a portion of the apparatus depicted generally in FIGS. 2 and 3.

DETAILED DESCRIPTION

Figure 1:
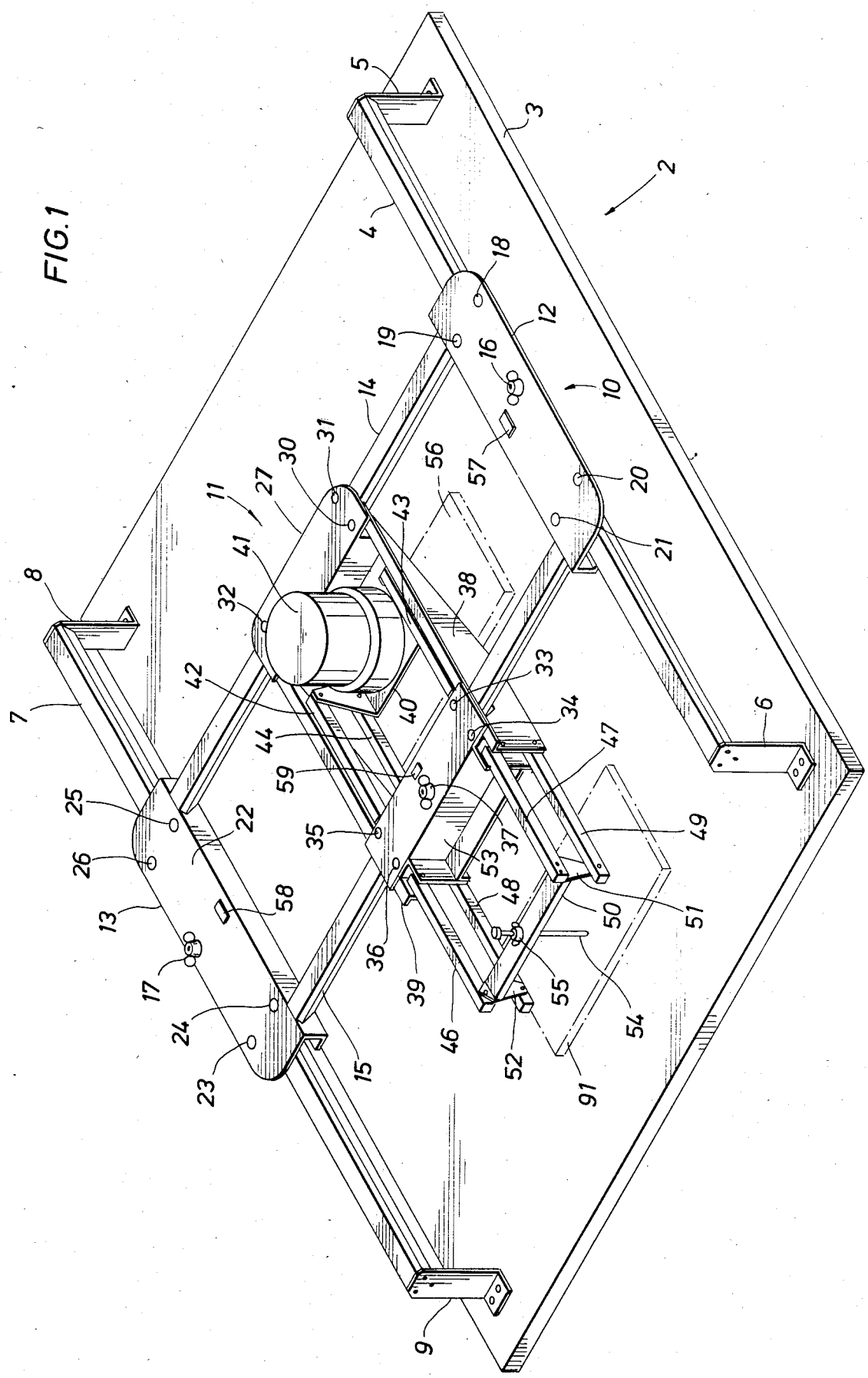
FIG. 1 is a simplified pictorial representation of a cutting assembly embodying the present invention and suitable for cutting a work piece in functional relationship to a traced pattern or design.

Referring now to FIG. 1, there is depicted therein a machine with a revolving vertical cutter bit (not seen) for milling out the surface of wood, metal and the like. More particularly, the cutting or router assembly 2 is preferably mounted on a table 3, and includes a pair of longitudinal rails 4 and 7 supported by L-brackets 5, 6 and 8, 9, respectively. Rails 4 and 7 slidably support a main carriage 10 which includes longitudinal glide members 12 and 13 which, in turn, are interconnected with the ends of lateral rails 14 and 15 extend between and are attached to glides 12 and 13 to form the structure of main carriage 10.

A pair of thumb screws are shown at 16 and 17 which act in the fashion of brakes, as will be explained hereinafter in more detail with reference to other figures, and the elements of main carriage 10 are maintained in fixed relationship one to another by bearing bolts 18-21 and 23-26 as should be apparent from FIG. 1.

While longitudinal rails 4 and 7 carry and support main carriage 10, it will be seen in FIG. 1 that lateral rails 14 and 15 of main carriage 10 carry and support subcarriage 11. The subcarriage 11 will be seen to comprise in a similar fashion lateral glide members 27 and 53 attached together with the aid of bearing bolts 29-36. Thumb screw 37 performs the function of a brake, as do thumb screws 16 and 17 of main carriage 10, as will be detailed hereinafter. Arm members 38 and 39 finish the main structural components of subcarriage 11 and are interconnected with glides 27 and 53 to form the subcarriage 11. A motor 41 rests on plate 40 and plate 40 is controlled by a series of upper forward linking members 42 and 43 as seen in FIG. 1, and lower forward linking members 44 as seen in FIG. 1, and 45 as shown in FIG. 3. In FIG. 1, member 45 is oriented the same as member 44 but is hidden by arm 38.

A corresponding and similar set of rear upper and lower linking members in FIG. 1 are seen at 46, 47 and 48, 49 respectively, and such rear upper and lower linking members 46-49 are interconnected with forward upper and lower linking members 42-45 as to be movable in response to one another and in the same direction with respect to the vertical. Hence, if plate 40 moves downwardly, then rear strut 50 moves downwardly in correspondence hereto. This is caused by virtue of the fact that while the upper forward and rear linking members 42-43 and 46-47 are not directly interconnected one to the other, the lower sets 44-45 and 48-49 are, and therefore, an equal movement of plate 40 with respect to strut 50 is obtained. This is more clearly apparent in FIG. 4, where upper linking members 42 and 46 are seen to terminate at pivot pins 74 and 76 respectively, whereas the lower linking members 44 and 48 are connected to pivot pins 84 and 85 yet are interconnected one to the other by pivot pin 88. Hence, the equal and corresponding similar type of movement of plate 40 with respect to strut 50 is achieved as depicted in FIG. 4 in phantom.

With reference again to FIG. 1, brackets 51 and 52 extend between linking members 46-49 and are used to form the attachment for reat strut 50, which carries stylus 54. Stylus 54 traces pattern 91, which pattern is sought to be duplicated on work piece 56. A locking unit 55 provides for adjusting the vertical penetration of stylus 54 below strut 50, whereby stylus 54 may be set to preselected vertical relationships with respect to pattern 91.

Figure 9:
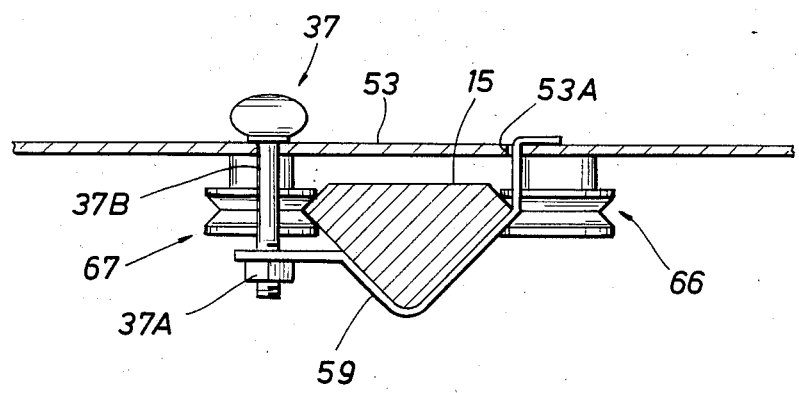
FIG. 9 is another different pictorial representation of another different portion of the apparatus depicted in FIG. 1.
Figure 10:
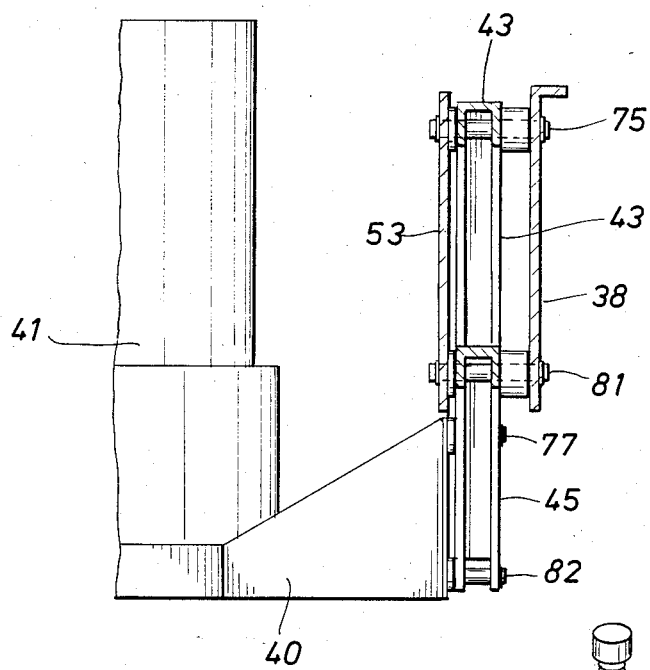
FIG. 10 is a further different pictorial representation of another portion of the apparatus depicted in FIG. 1.

Further, in FIG. 1 there will be seen broadly, a set of three brake straps 57-59, two of which are longitudinal brake straps 57 and 58 and one lateral strap 59. Straps 57-59 each work together in correspondence with one of the thumb screw braking members 16, 17, and 37 respectively. FIG. 9 shows the detail of strap 59 and it should be understood that the same operation refers to straps 57 and 58. Thus, in FIG. 9 brake strap 59 extends through slot 53A in lateral glide 53 and when pressed against lateral rail 15 by turning bolt 37B in Nut 37A, movement of glide 53 along rail 15 is halted. Movement can be resumed of course by loosening bolt 37B in Nut 37A with thumb screw 37. Such operation as stated hereinbefore, applies to brake straps 57 and 58 and thumb screws 16 and 17 respectively, even though not specifically illustrated, as should be apparent. It should be noted that when all of brakes 16, 17, and 37 are off, then stylus 54 is free to move anywhere in the plane of table 3. When brake 37 is applied and brakes 16 and 17 are off, then stylus 54 can move longitudinally anywhere, but in only one path laterally. The reverse is true when brake 37 is off and brakes 16 and 17 are on. Such brake operation makes possible continuous and straight line milling out and parallel line method and procedures.

Figure 4:
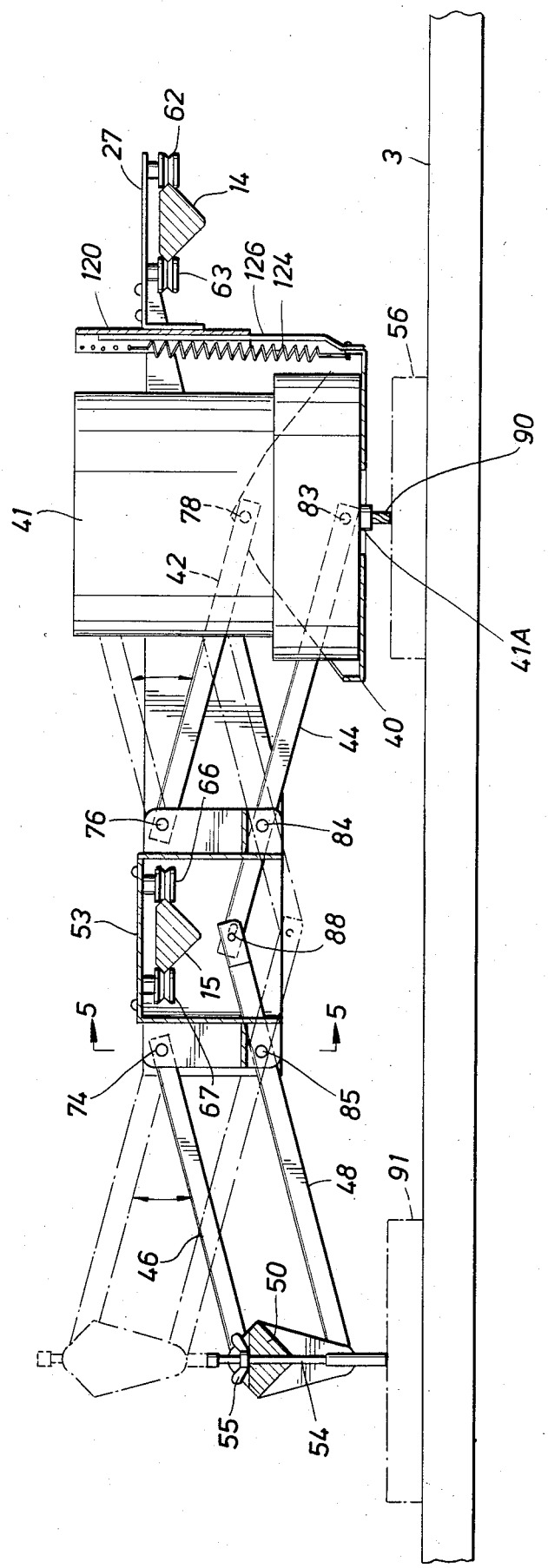
FIG. 4 is a side-view pictorial representation of a portion of the apparatus depicted generally in FIGS. 2 and 3.
Figure 6:
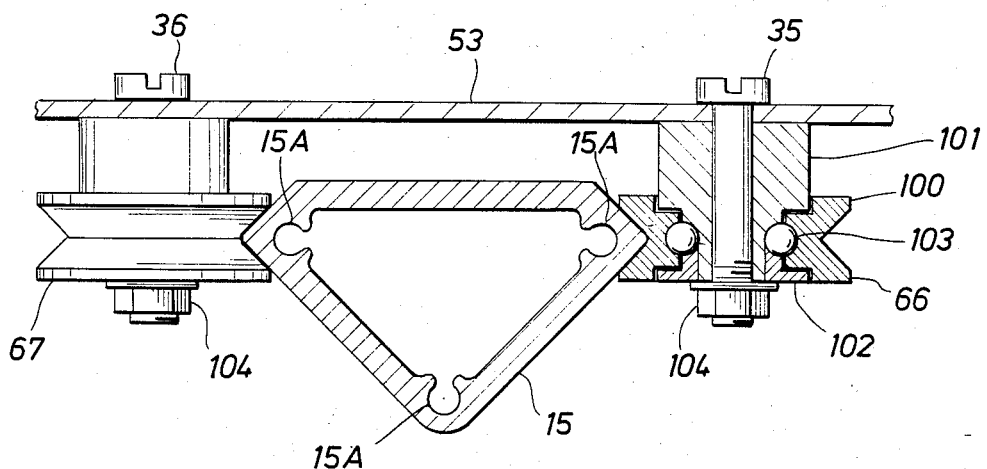
FIG. 6 is also a simplified pictorial representation of another different portion of the apparatus depicted in FIG. 1.
Figure 7:
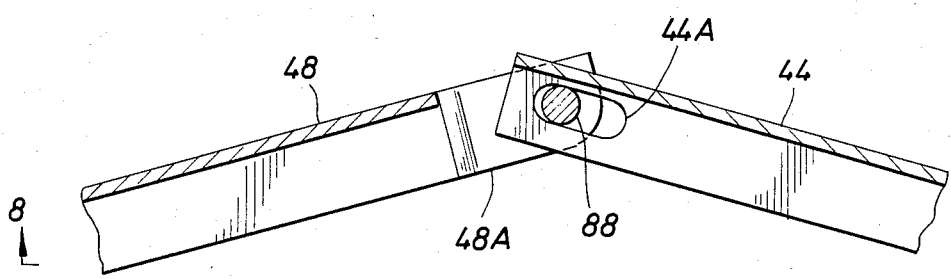
FIG. 7 is another simplified pictorial representation of a further different portion of the apparatus depicted in FIG. 1.
Figure 8:
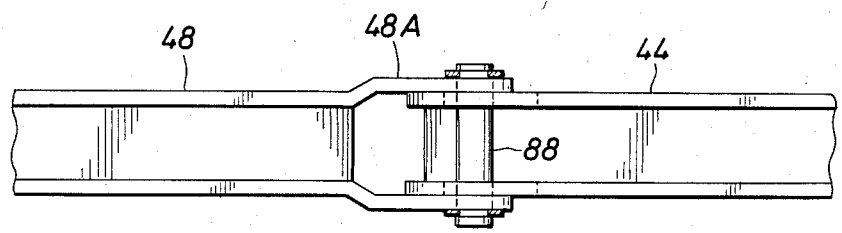
FIG. 8 is a different pictorial representation of the apparatus depicted in FIG. 7.

Both of carriage assemblies 10 and 11 move back and forth on rails 4, 7 and 14, 15 respectively, by means of a series of lateral bearings 60-67 shown in FIGS. 2-4, 6 and 9 with respect to subcarriage 11, each bearing having associated therewith one of bearing bolts 30-36 shown in FIGS. 1, 6 and 9. For example, as seen in FIG. 4, glides 27 and 53 each move over rails 14 and 15 by means of a pair of the bearings 62, 63 and 66, 67, respectively. Such paired up bearing spacing can be seen in FIG. 2 with pairs 60, 61; 62, 63; 64, 65; and 66, 67; each straddling one of rails 14 and 15. Bearing 66, for example, and as seen in FIG. 6, is carried by glide 53 by means of bearing bolt 35, which includes a retainer nut 104 at the lower extremity, together with a bearing unit having upper and lower inner races 101 and 102, outer race 100, and ball 103 therebetween. Hence, when glide 53 is moved along track 15, bearing 66 moves therewith along rail 15 and about the bearing assembly 100-103. The detail shown in FIG. 6 with respect to bearing 66 applies to the other lateral bearings 60-67 and it is not believed necessary to show each in detail. The same arrangement is provided for glides 12 and 13 in FIG. 1, for example, and while only bearing bolts 18-26 are seen, it is intended to be of similar arrangement as seen in FIG. 6.

Referring to FIG. 4, the previously mentioned equal and corresponding movement of plate 40 and hence, cutting bit 90, with respect to stylus 54 and strut 50, is achieved by a series of some eighteen (18) pivot pins 71-88 shown, for example, in FIGS. 2-5, 7, 8, and 10-12. These pins allow the upper linking members 42 and 43 to move independently of upper linking members 46 and 47, whereas the lower sets are interconnected through pivot pins 84, 85, and 88, as seen in FIG. 4. Linking members 45 and 49 on the side opposite members 44 and 48 are similarly connected but not specifically illustrated, as seen in FIG. 4. The up and down movement at pin 88, for example, in FIG. 4 as shown in phantom, is provided by slot 44A shown in detail in FIGS. 7 and 8, whereby pin 88 is free to ride in slot 44A as the pin 88 assumes the alternate positions as depicted in FIG. 4, for example. Rails 4, 7, 14, and 15 can be a solid construction or can be hollow, as shown in FIG. 6. For example, a series of channels 15A at each of the corners improves the rigidity of the structure and provides a better resistance to the torque generated in the system.

Figure 5:
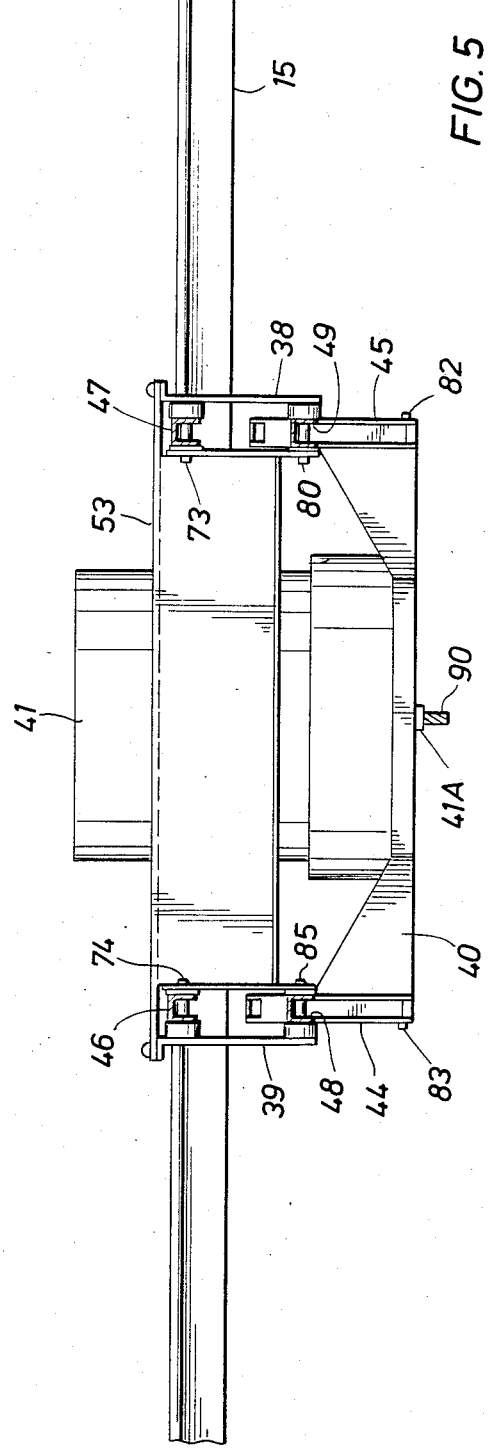
FIG. 5 is an end-view pictorial representation of the apparatus depicted in FIG. 4.

As noted hereinabove, plate 40 supports drive motor 41 and as seen in FIG. 2, the plate 40 includes therein a series of slots 40A for the passage of bolts (not shown) to secure the motor to the plate 40. In addition, a center hold 40B is carried by plate 40 to permit passage of the motor shaft 41A (FIG. 3) to which is attached cutting bit 90 (FIGS. 4 and 5).

With further regard to FIG. 4, when it is desired to mill out a surface 56, bit 90 is moved to the work piece surface 56 by pressing strut handle 50 downwardly and so to trace stylus 54 on pattern 91. Since it is not desired to leave bit 90 down against work piece 56 when the device is not in operation, or when interruptions occur, plate 40 is normally spring biased upwardly to raise plate 40 and hence, stylus 54, above pieces 56 and 91, when no downward pressure is applied to strut handle 50. This is achieved by means of a pair of springs, only one of which is seen in FIG. 4. Hence, in FIG. 12 there will be seen springs 124 and 125 attached at one end to pins 122 and 123 in plate 40. Channel member 120 is connected to glide 27 and bracket portion 121 of strap 126 is attached to plate 40 and rides in channel member 120, as determined by bolt 117 in upper slot 127 and a similar bolt (not shown) in lower slot 128. Bolt 117 carries washer 118 and the tightening of wing nut 119 determines the position of bolt 117 in slots 127 and 128 and sets the limit of travel of strap member 126 in channel 120. The upper end of springs 124 and 125 can be set in any of a number of holes in channel 120 in order to increase or decrease the bias on plate 40. Hence, in FIG. 4, when the operator releases handle 50, spring 124 together with spring 125 (not shown) raise plate 40 above work piece 56 and stylus 54 together with handle 50 are raised to the position shown in phantom. To re-engage bit 90 with work piece 56, handle 50 is pressed downwardly.

Figure 11:
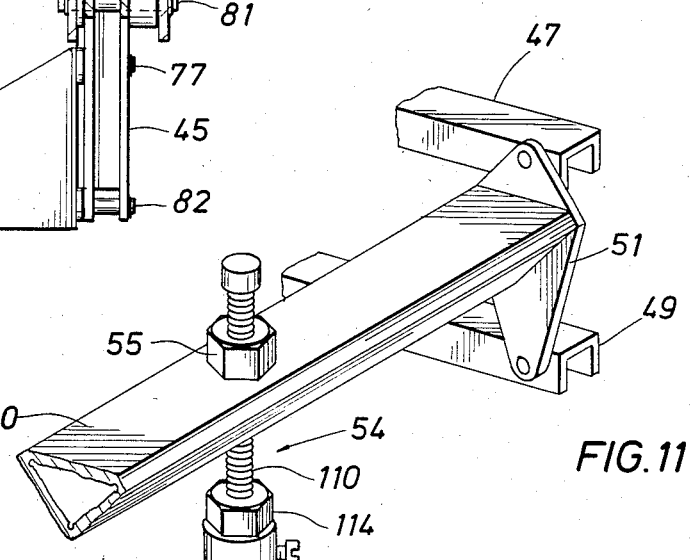
FIG. 11 is also a different pictorial representation of another portion of the apparatus depicted generally in FIG. 1.
Figure 12:
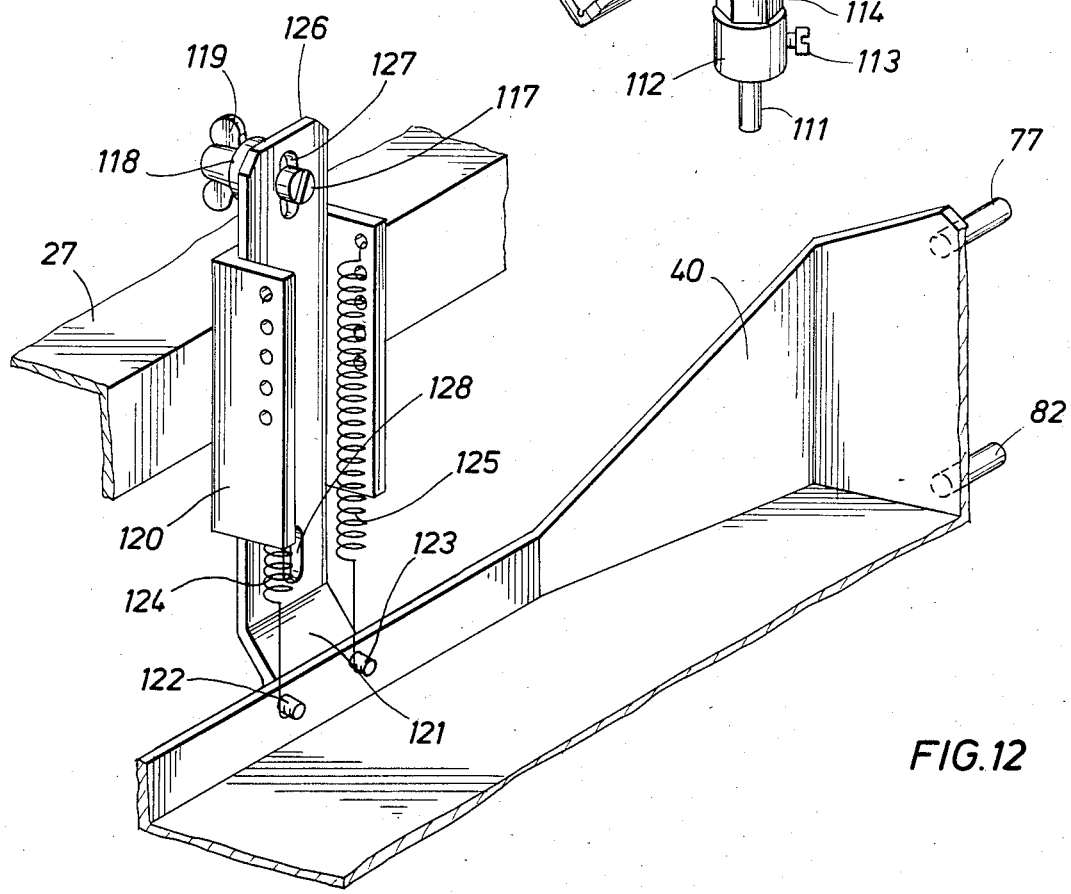
FIG. 12 is a simplified pictorial representation of apparatus suitable for use with the apparatus depicted in FIG. 1.

The stylus 54 of FIGS. 1, 3, and 4 is seen in more detail in FIG. 11 and will be seen to comprise, for example, a fully threaded bolt shaft 110 extending through strut handle 50 and fixed with respect to handle 50 by locking nut 55. Shaft 110 can be raised or lowered by loosening or tightening of this locking device 55. Below handle 50 on shaft 110 will be seen a stylus tip 111, which is carried within a holder 112 having a set screw 113 therein to retain tip 111 therein. Holder 112 is threaddedly attached to screw shaft 110 and lower lock nut 114 locks holder 112 onto shaft 110. Manipulation of lock nuts 55 and 114 achieves the proper and variable elevations of tip 111 desired. Set screw 113 also provides for tip 111 to be interchangeable in order to accommodate tips of varying length or diameter. A spring loaded tip 111 is also contemplated herein such as to be movable in and out of holder 112. Hence, in this embodiment it can be seen that not only in the stylus tip 111 adjustable in height but changeable as to size, type, and length.

It will be apparent from the foregoing that many other variations and modifications may be made in the structures and methods described herein without departing substantially from the essential concept of the present invention. Accordingly, it should be clearly understood that the forms of the invention described herein and depicted in the accompanying drawings are exemplary only and are not intended as limitations in the scope of the present invention.

What is claimed is:

1. Shaping means for shaping a work piece, comprising
   cutting means for rotatably cutting said work piece,
   stylus means for engaging and tracing a pattern exhibited on a paper and the like, and
   support means for maneuvering said cutting means in alignment with said stylus means, including
   first shorter and longer strut members each pivotally connected adjacent at one end with said stylus means,
   second shorter and longer strut members each pivotally connected adjacent at one end with said cutting means, and
   linking means pivotally interconnected with the other ends of said first and second shorter strut members and at points between the ends of said first and second longer strut members,
   said first and second longer strut members further being pivotally and slidably interconnected adjacent the other ends thereof.

2. The shaping means described in claim 1, wherein said support means includes bracing means for vertically supporting said cutting means relative to said work piece.

3. The shaping means described in claim 2, wherein said bracing means comprises
   bracket means fixedly positioned adjacent and independently of said cutting means, and
   slide means fixedly mounted on said cutting means and slidably engaging said bracket means.

4. The shaping means described in claim 3, further comprising positioning means for yieldably spacing said cutting means from said work piece.

5. The shaping means described in claim 4, wherein said positioning means further spaces said stylus means relative to said cutting means.

6. The shaping means described in claim 5, wherein said positioning means spaces said cutting means a preselected distance from said work piece.

7. The shaping means described in claim 6, wherein said positioning means includes an elastic member yieldably interconnected said bracket and slide members.

8. The shaping means described in claim 1, wherein said cutting means includes
   plate means interconnected with said second shorter and longer strut means,
   motor means fixedly positioned on and supported by said plate means, and
   bit means rotatably interconnected with said motor means for engaging the surface of said work piece.

9. The shaping means described in claim 8, wherein said second shorter and longer strut members are each pivotally connected adjacent said one end thereof with said plate means.

10. The shaping means described in claim 9, wherein said first and second shorter strut members are substantially equal in length.

11. The shaping means described in claim 10, wherein said longer strut members are longer in length than said shorter strut members.

12. The shaping means described in claim 11, wherein said longer strut members are positioned below said shorter strut members.

13. The shaping means described in claim 12, further comprising
    bracket means fixedly positioned adjacent and independently of said plate and motor means,
    slide means fixedly mounted on said plate means and slibably engaging said bracket means.

14. The shaping means described in claim 13, wherein said bracket means grippingly and slidably engages said slide means for supporting said motor and bit means in alignment with said stylus means.

15. The shaping means described in claim 1, wherein said stylus means comprises
    gripping means interconnected with said support means, and disposed adjacent and above said pattern on said paper and the like,
    holder means interconnected with said gripping means and having an aperture therein, and
    tip means slidably disposed in said holder means and extending toward said paper and the like.

16. The shaping means described in claim 15, further including locking means for securing said tip means in said holder means.

17. The shaping means described in claim 16, wherein said holder means includes
    sleeve means for receiving and supporting said tip means, and
    extension means interconnecting and spacing said sleeve means a preselected distance from said gripping means.

18. The shaping means described in claim 17, wherein said locking means releasably secures said tip means in said sleeve means.

19. The shaping means described in claim 18, wherein said sleeve means is fixedly mounted on one end of said extension means.

20. The shaping means described in claim 18, wherein said sleeve means is partially and slidably inserted yieldably in said extension means.

* * * * *